Nov. 4, 1958
J. S. SOHN
2,859,328
GAS SHIELDED ARC WELDING
Filed April 29, 1954
3 Sheets-Sheet 2
FIG. 2
FIG. 3
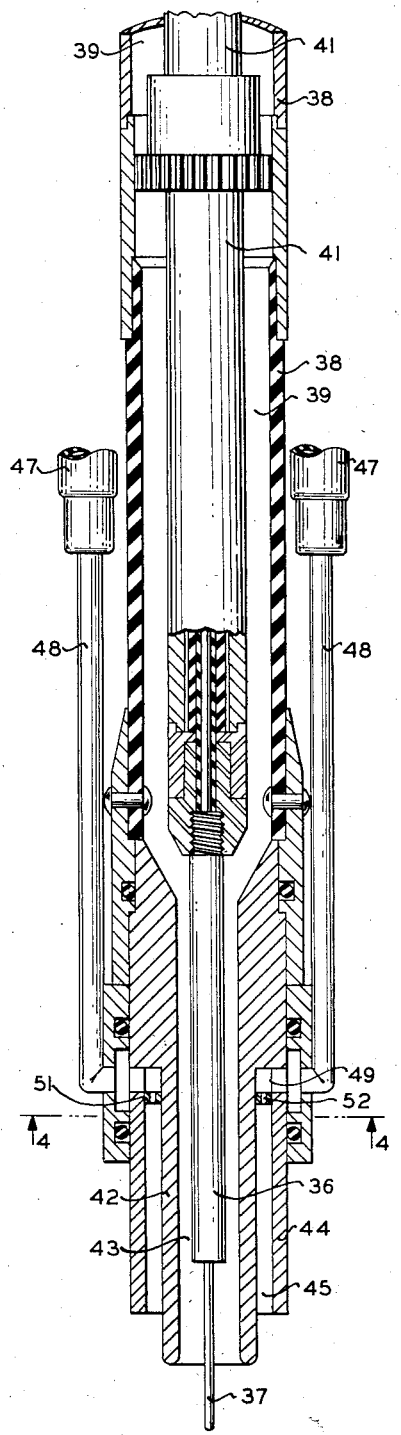
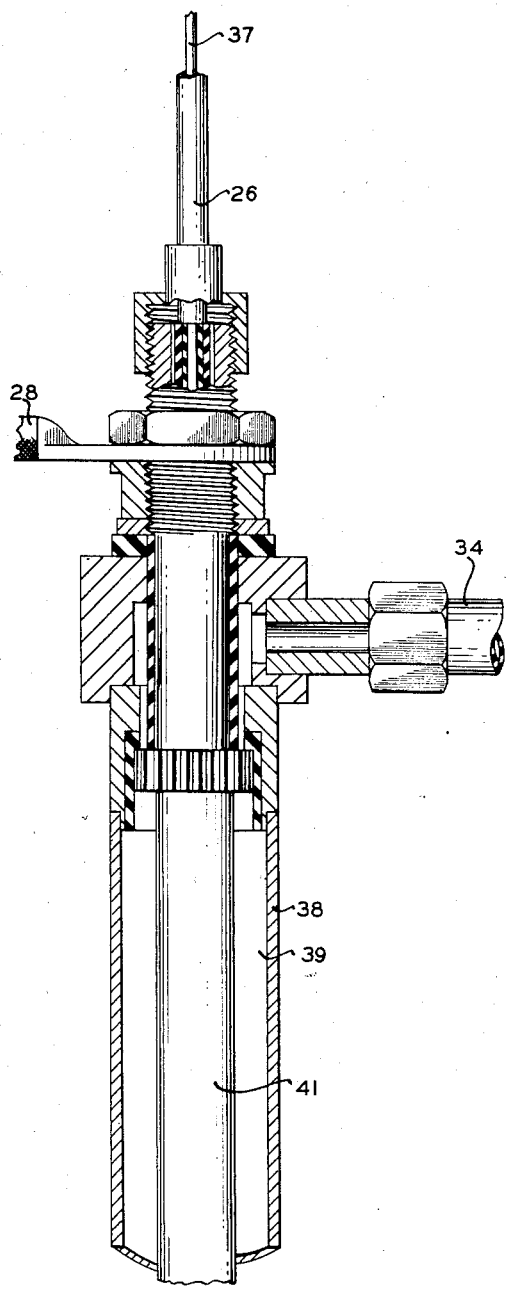
INVENTOR
JESSE S. SOHN
ATTORNEY

INVENTOR
JESSE S. SOHN

United States Patent Office 2,859,328
Patented Nov. 4, 1958

2,859,328

GAS SHIELDED ARC WELDING

Jesse S. Sohn, Succasunna, N. J., assignor to Air Reduction Company, Incorporated, New York, N. Y., a corporation of New York Application April 29, 1954, Serial No. 426,397

5 Claims. (Cl. 219—74)

This invention relates to gas shielded arc welding. More specifically it relates to gas shielded arc welding with multiple shielding gas streams.

Inert gas shielded arc welding with both consuming and non-consuming electrodes is an important and useful welding method and for many welding applications it has become substantially indispensable. Because of its assets the process is enjoying wide popularity despite the fact it employs relatively expensive inert gas as the shielding medium.

An object of this invention is to provide methods and apparatus for effecting a saving in the cost of shielding gas for gas shielded electric arc welding.

Another object is to provide methods and apparatus to obtain the arc characteristics of one shielding atmosphere with the shield forming characteristics of another shielding atmosphere.

Another object is to provide methods and apparatus for improving gas coverage in narrow joints with a given gas flow.

These and other objects and advantages of the invention will be pointed out or will become apparent from the following description and the accompanying drawings. In general this invention contemplates the utilization of a plurality of shielding gas streams cooperating to form a composite shield having advantageous properties and economies.

Fig. 2 illustrates, partially in section and to a larger scale, the lower portion of the welding head shown in Fig. 1.

Fig. 3 illustrates, partially in section and to a larger scale, the upper portions of the welding head shown in Fig. 1.

Figure 1:
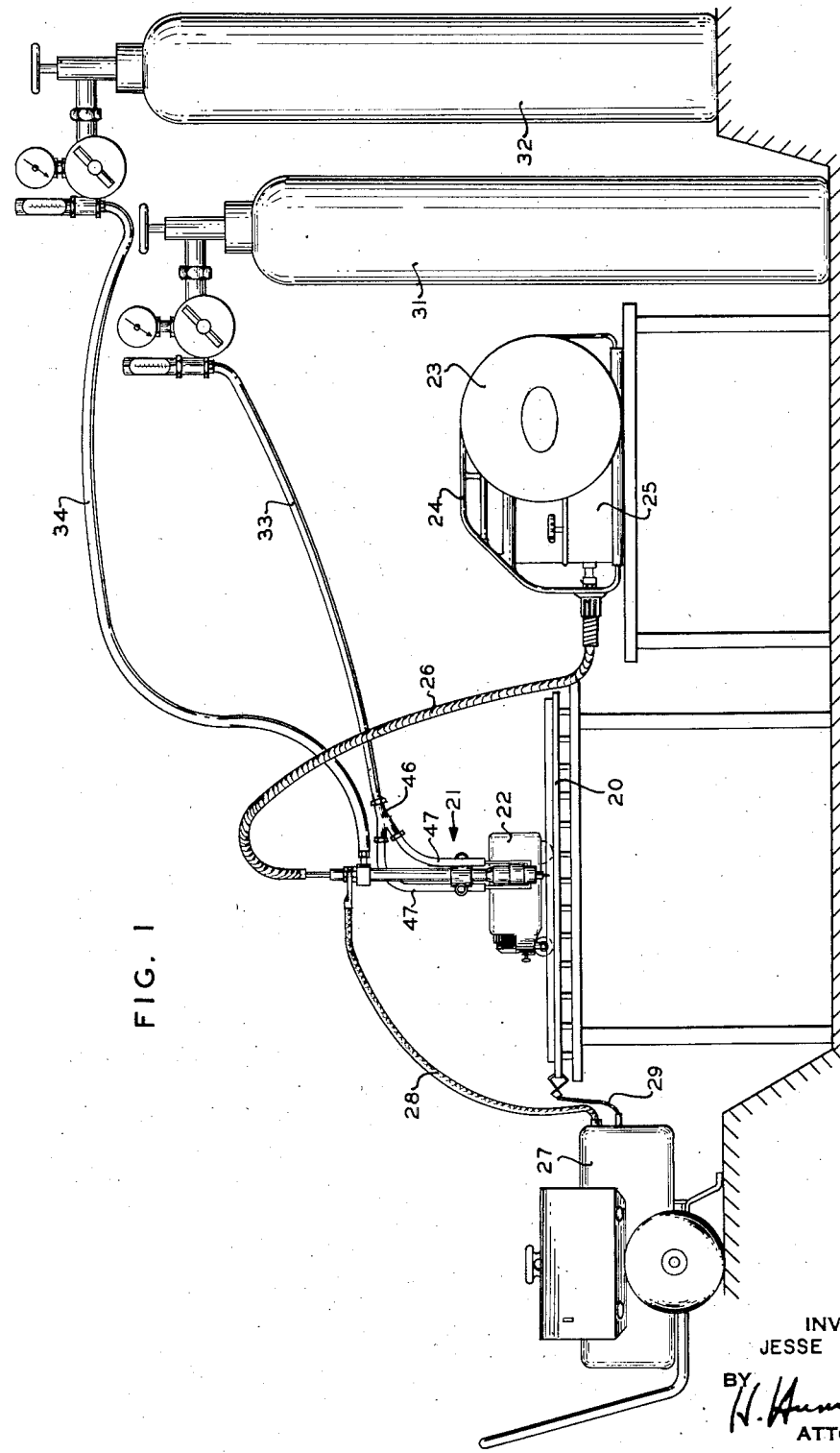
Fig. 1 illustrates generally suitable apparatus for the present invention.

In inert gas shielded metal arc welding of the type disclosed in Muller et al. Patent No. 2,504,868 for instance, it is frequently advantageous to employ helium as the shielding medium to take advantage of the higher arc voltage, the resulting higher welding speed, and the broader weld bead that is obtained as compared with the use of argon as the shielding medium. However helium is very light and therefore sensitive to drafts, and in order to provide adequate stiffness in the projected helium shield, relatively high shielding gas flow rates are required. This is particularly true in downhand welding where the light helium tends to rise off the work. Argon on the other hand is relatively heavy and good shield stiffness can be obtained with considerably lower gas flow rates than with helium. It has now been found that the arc characteristics of one gas, such as helium, a light gas, and the shielding properties of another gas, such as argon, a heavy gas, can both be attained and at the same time a saving in the total cost of shielding gas effected, by employing a novel, laminated, multiple gas shield composed of a plurality of laminar or non-turbulent flowing gas streams preferably arranged in concentric relation. A relatively small flow of helium through an inner nozzle may be surrounded by an annular stream of argon. Because of the relatively great density of argon, comparatively small quantities are required to form a stable, stiff shield cooperating with the inner helium shield to effect the desired results. Inasmuch as the success of the inert gas shielded arc welding process depends in part on the formation and maintenance of an adequate gas shield, the gas must be fed to the region of the arc as a non-turbulent flow stream. The presence of turbulence in a free flowing stream entrains gas from the ambient atmosphere, and in the case of an arc shielding gas stream, the entrained ambient atmosphere, usually air, changes the electrical characteristics of the arc and the metal transfer characteristics across the arc. When the surrounding atmosphere is air, this entrainment causes the formation of oxides and nitrides as well as porosity, in the weld metal. The shielding gas stream, therefore, must be substantially non-turbulent and of sufficient thickness and stiffness to retain its flow characteristics for an appreciable time (distance) as it is projected from the gas nozzle. It has now been found that if concentric annular streams of shielding gas are projected from a properly formed nozzle at appropriate pressure and velocity, these streams will retain their individual identity for a sufficient time to enable them to be useful in gas shielded arc welding. Under these conditions a small diameter low flow stream of helium may be projected with non-turbulent flow characteristics from an inner nozzle to form a shield immediately surrounding the end of the electrode and the arc. In the absence of an outer confining gas stream this thin low flow inner helium shield would not be adequate to produce good welding results. The non-turbulent flow characteristics would deteriorate prematurely causing entrainment of air. Even if the flow rate were increased to improve shield stiffness (effective projected distances), the shielding would be inadequate because the required increased velocity would cause turbulence. However, if a surrounding stream of argon is projected from a properly designed concentric surrounding nozzle, it will restrain the surrounded gas stream and cause it to retain its non-turbulent flow characteristics for a sufficiently long time (projected distance) to enable this small diameter inner gas stream to effectively provide the required shielding atmosphere for the arc. The inner stream gas is preferably provided in sufficient quantity to prevent radial flow inwardly toward the arc of the outer gas stream as a result of the impingement of the composite stream on the work.

As pointed out above the greater the density of the gas the less flow is required to produce a satisfactory shielding envelope. By using a heavier (more dense) gas as an outer surrounding shield around the light gas provided in the center in the immediate vicinity of the arc, adequate shielding can be obtained with much reduced total gas flow as compared with the total gas flow required if the entire shield consisted only of the light inner shield gas. The composite laminated shield is projected in such a manner that both streams are substantially non-turbulent and free from intermixing. Such mixing is a minimum when the velocities of the streams at their interface are substantially the same. Diffusion of the outer gas into the inner gas is not a factor because of the relatively short time it takes for a unit volume of gas to pass from the nozzle orifice to the work.

Referring to Fig. 1 a workpiece to be welded is designated 20. A welding head 21 is illustrated as supported in operable relation to the workpiece by any conventional means. Relative motion is provided between the workpiece and the welding head by the motorized carriage 22 on which the welding head is supported. The welding apparatus illustrated is in general of the type disclosed and claimed in Muller et al. Patent 2,504,868. It comprises a reel containing a continuous length of electrode wire and means for withdrawing this wire and feeding it through the welding head to the weld zone where an electric arc is maintained from the electrode wire to the work. The wire reel 23 is mounted on a carriage frame 24 which houses a wire feed motor and associated wire feeding apparatus designated generally as 25. Wire is withdrawn from the reel 23 by the wire feeding mechanism 25 and pushed through a flexible casing 26 to the welding head 21. Welding current is supplied from a welding machine 27 through the welding cable 28 to the welding head 21. A ground lead 29 connected from the workpiece 20 to the welding machine 27 completes the welding circuit. Shielding gas is provided from compressed gas cylinders 31 and 32 through the usual pressure and flow control apparatus to the welding head 21 by tubes 33 and 34.

Figure 4:
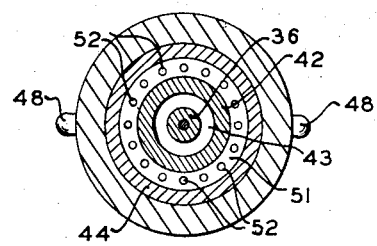
Fig. 4 is a sectional view taken along line 4—4 of Fig. 2.
Figure 5:
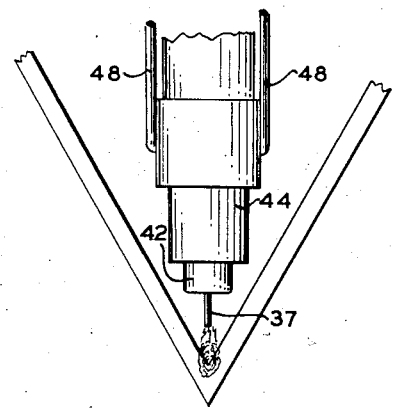
Fig. 5 illustrates the application of the invention to a deep joint.

Figs. 2, 3, and 4 illustrate the construction of the welding head in greater detail. Basically it comprises a welding current contact tube 36 which is electrically connected through the internal metal parts of the welding head to the welding cable 28. The electrode wire 37, fed to the welding head through casing 26, passes down through the welding head which includes the contact tube 36. Welding current is transferred to the electrode wire from the contact tube 36. The welding arc is maintained from the end of wire 37 to the workpiece 20. The welding head includes an outer barrel 38 which forms an annular gas passage 39 surrounding a welding head inner barrel 41. Shielding gas supplied from cylinder 32 through hose 34, passes down through this annular passage 39 into an inner gas nozzle 42. An annular gas discharge passage 43 is formed by the inner nozzle structure 42 which has straight cylindrical walls concentrically surrounding the contact tube 36 and the protruding portion of the electrode wire 37. An outer nozzle structure 44, also having straight cylindrical walls concentrically surrounds the inner nozzle to form an outer annular gas discharge passage 45. This passage is supplied with shielding gas from cylinder 31 through hose 33, Y-connection 46 (Fig. 1), flexible tubes 47 and rigid tubes 48 to an annular manifolding space 49 at the head of the outer nozzle discharge passage. A distributing and diffusing ring 51 having a plurality of equi-spaced orifices 52 provides the necessary balanced distribution of gas to the outer nozzle. The shielding gas discharging from the outer nozzle 44 forms an annular shielding gas stream concentrically surrounding the inner gas stream provided by the inner nozzle 42. Fig. 4 which is a section taken along the line 4—4 of Fig. 2 more clearly discloses the construction of this double annular nozzle.

It is significant in the construction of these double annular nozzles according to the present invention that they be of such configuration as to be capable of producing laminar flow streams at practical gas flow velocities. Thus in the specific embodiment indicated, the inner diameter of the inside nozzle 42 is ½ inch. The diameter of the contact tube which the inner nozzle surrounds is ¼ inch. This contact tube has a suitable inner diameter for use with 1/16 inch diameter electrode wire. As is clearly seen on the drawings, there is a long unobstructed approach to the inner nozzle which assures non-turbulent flow with helium within appropriate gas flow rates of the order of magnitude of 50 cubic feet per hour. The outer nozzle 44 in the specific embodiment illustrated has an inner diameter of 13/16 inches. The outer diameter of the inner nozzle 42 is ¾ inch. This outer nozzle has an unobstructed length from the distributing element 51 to the discharge face of the nozzle of 1⅞ inches. This construction produces an outer gas shielding stream having laminar characteristics with argon at flow rates of the order of magnitude of 15 cubic feet per hour.

It has been found that if helium is employed in the inner nozzle and argon in the outer nozzle the high voltage high speed helium arc can be obtained with relatively low helium flow rates. The surrounding argon shield restrains and contains the helium shield and prevents it from losing its laminar characteristics prematurely. This effect plus the additional shielding provided by the argon results in a welding process having all the advantages of both the helium and argon shields. It has been found, for example, that with a conventional single shield 100 cubic feet per hour of helium are required to achieve the desired results in a particular welding application. With the present invention the identical results can be obtained by employing 50 cubic feet per hour of helium in the inner nozzle and 15 cubic feet per hour of argon in the outer nozzle. At a cost of $ .07 per cubic foot of helium and $ .10 per cubic foot of argon the total cost of shielding gas per hour was reduced from $7.00 to $5.00 per 100% duty cycle by the use of the present invention. While this invention is not limited to the use of argon surrounding helium, it is essential that the gas employed as the outer shielding medium be heavier than the gas employed immediately surrounding the arc.

It has been found that this double annulus type nozzle not only makes it possible to obtain the arc characteristics of one shielding gas and the shielding characteristics of another simultaneously, and thereby effect a saving in the cost of welding, but it has also been found that this double annulus type nozzle has certain other advantages. When working in a relatively deep and narrow joint such as a fillet in a V-joint as illustrated in Fig. 4, it has heretofore been relatively difficult to obtain adequate shielding because of the inability to place the single nozzles of the prior art far enough down into the joint, because of the space limitations, to project a non-turbulent gas stream to the root of the joint. With a dual nozzle structure of the type contemplated by this invention the inner nozzle may be made to project farther than the outer nozzle so as to give the welding head a generally tapering contour. This permits the nozzle to be inserted deeper into the narrow joint and assists greatly in the provision of an adequate shield. The heavier argon gas can be projected farther than the helium, which is exactly in accordance with the requirements in a joint of this type. This also permits welding such joints without an excessive length of the electrode wire projecting beyond the end of the contact tube which length is subjected to the resistance heating effect of the welding current.

While this invention has been described with respect to inert gas shielded consuming electrode arc welding, the principles are equally applicable to inert gas shielded non-consuming electrode arc welding.

While only one embodiment of the invention has been shown and described herein, it is to be understood that the invention is not limited to the particular form shown but may be used in other ways without departure from its spirit as defined by the following claims.

I claim:

1. A method of gas shielded arc welding which comprises establishing and maintaining an electric welding arc between an electrode and a workpiece, surrounding said arc with a shielding gas stream comprising essentially inert monatomic gas projected as a non-turbulent flow stream, and confining said arc surrounding stream with a non-turbulent flow stream of a gas that is substantially non-reactive with the molten weld metal and which has a greater density than the inert gas in said arc surrounding stream.

2. A welding method according to claim 1 in which the inner arc surrounding gas stream is helium and the outer confining stream is a monatomic inert gas of greater density than helium.

3. A welding method according to claim 1 in which the inner arc surrounding gas stream is helium and the outer confining stream is argon.

4. A method of gas shielded arc welding which comprises maintaining an arc from an electrode to a workpiece, projecting a flowing stream of inert gas having non-turbulent flow characteristics from a nozzle immediately surrounding said electrode, said stream being incapable in itself of adequately shielding the terminal portion of said electrode, said arc, and the molten weld metal produced by said arc, and projecting around said first stream a second flowing stream of a gas that is substantially non-reactive with the weld metal, which has a greater density than the inert gas of said first stream, and which is concentrically arranged with respect thereto, said second stream acting to confine said first stream to produce therewith an effective shield for the terminal portion of said electrode, said arc, and the molten weld metal produced by said arc.

5. In inert gas shielded arc welding the improvement which comprises providing the shielding gas as a free flowing laminated stream having an inner core of inert monatomic gas and a surrounding stream of a gas that is substantially non-reactive with the weld metal and which is of greater density than the inert monatomic core gas, projecting both the inner and outer portions of said laminated stream with substantially non-turbulent flow characteristics, and providing sufficient volumetric flow in said inner stream to prevent radial flow inwardly toward the arc of gas from the outer shield stream as a result of impingement of the laminated stream on the work.

References Cited in the file of this patent
UNITED STATES PATENTS

| | | |
|---|---|---|
| 2,504,867 | Muller | Apr. 18, 1950 |
| 2,522,482 | Olzak | Sept. 12, 1950 |